US008370192B2

(12) United States Patent
Deo et al.

(10) Patent No.: US 8,370,192 B2
(45) Date of Patent: Feb. 5, 2013

(54) METHOD AND SYSTEM FOR DYNAMIC PROJECT MANAGEMENT AND CAPACITY MANAGEMENT

(75) Inventors: Christopher Deo, Hillside, NJ (US);
Tina Chester, Wayside, NJ (US);
Wonhee Flemming, Sterling, VA (US);
Kenneth Williams, Eatontown, NJ (US);
Robert Ziemann, Bridgewater, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1010 days.

(21) Appl. No.: 12/236,152

(22) Filed: Sep. 23, 2008

(65) Prior Publication Data

US 2010/0076803 A1    Mar. 25, 2010

(51) Int. Cl.
*G06Q 10/00* (2006.01)
(52) U.S. Cl. ..................................................... 705/7.36
(58) Field of Classification Search .................. 705/7.36
See application file for complete search history.

(56) References Cited

U.S. PATENT DOCUMENTS

| 5,765,140 | A  | * | 6/1998  | Knudson et al. | 705/7.15 |
| 6,101,481 | A  | * | 8/2000  | Miller         | 705/7.13 |
| 7,117,161 | B2 | * | 10/2006 | Bruce          | 705/7.26 |
| 2003/0217125 | A1 | * | 11/2003 | Brancati et al. | 709/220 |
| 2006/0190391 | A1 | * | 8/2006  | Cullen et al.  | 705/37 |
| 2008/0163156 | A1 | * | 7/2008  | Grey           | 717/101 |

* cited by examiner

*Primary Examiner* — Romain Jeanty
*Assistant Examiner* — Luis Santiago
(74) *Attorney, Agent, or Firm* — Fay Kaplon & Marcin, LLP

(57) ABSTRACT

Described herein are systems and methods for dynamic project management and capacity management. Specifically, the systems and method include a management tool for performing project management, capacity management, and time and cost creation across systems and departments for the lowest levels of data. The management tool include a computer readable storage medium including a set of instructions that are executable by a processor, the set of instructions being operable to store projected time information and projected cost information for a project, store actual time information and actual cost information for the project, and display a correlation between i) the projected time information and actual time information, and ii) the projected cost information and the actual cost information.

18 Claims, 15 Drawing Sheets

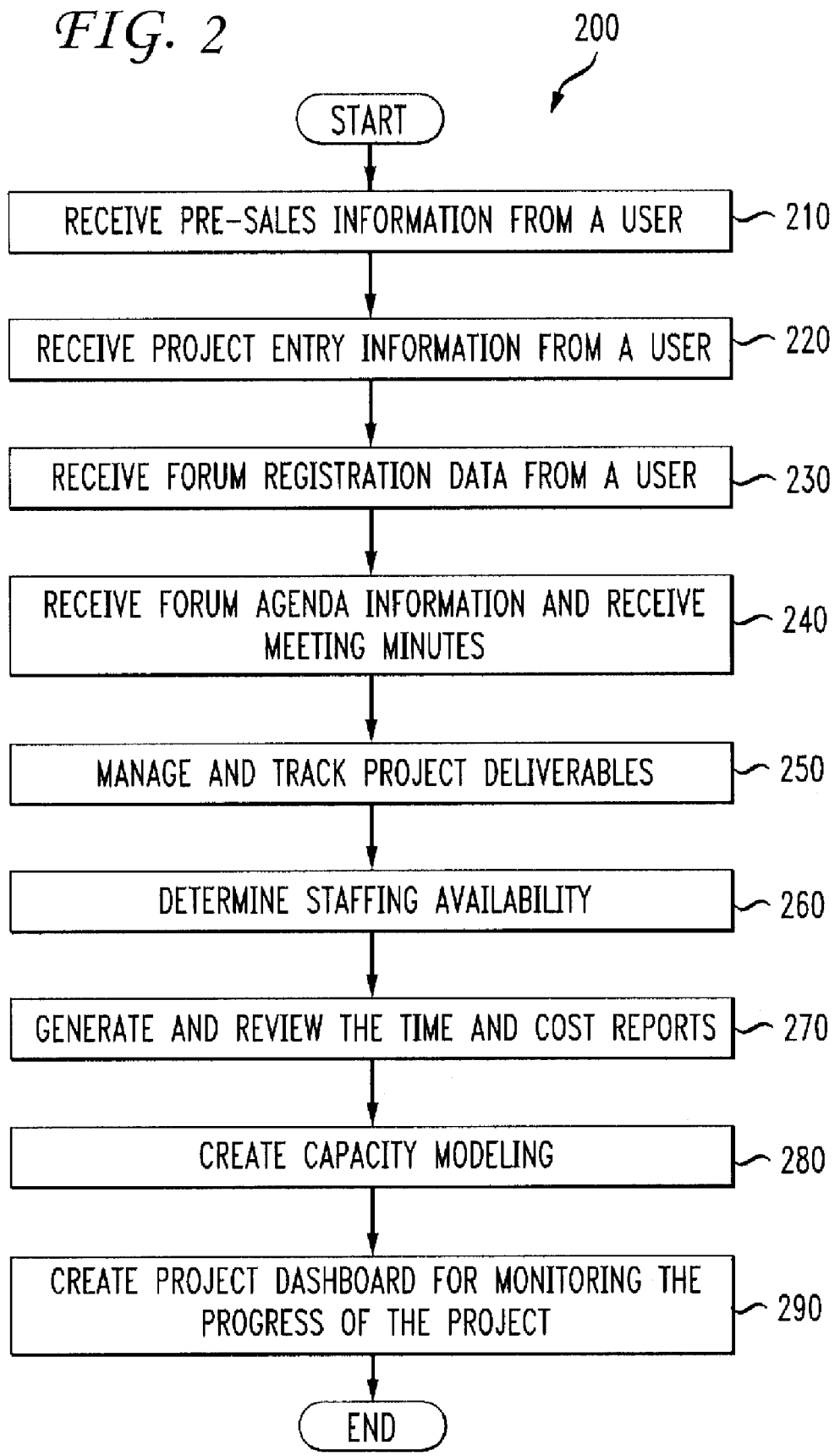

FIG. 3A

| PRE-SALES ENTRY | HOM Creation | IWR Entry | ON / IWR Search | Archive | | HOME | REPORTS | LOGOUT |

PRE-SALES ENTRY

310

ON [▽] | SEARCH | Exit | Save | Add New REP/Opportunity

REP/Opportunity # (ON) 00000009
Customer Solution Name* [▽]
Client Name* [▽]
PMT# * [▽]
IT Pre-Sales Business Manager* [▽]
Sales Team Manager* [▽]
Capture Manager* [▽]
Business Owner* [▽]
Resource Owner –SE* [TBD ▽]
Requirements Lead–Primary* [TBD ▽]

Status* [▽]
Overall REP/Opportunity Status*
Date REP/Opportunity Received*
Desired M( Date*
IT Response Required by Date*
Exception Due Date
Date IT Response Sent to Client
Date Client Accepted REP
Anticipated Date AT&T will Win Contract
Date AT&T Actually Won Contract
Anticipated Date Client will Sign Contract
Date Client actually Signed Contract

| SEL DEL | Impacted System(s) | Busn./Internal Consultant (BIC) | | HOM | | Add |
| | | Name | Phone Number | Date Requested | Date Received | |

Send E-mail to Selected BIC(s)  Display Consolidated HOMs

| | Author | REP/Opportunity Comments | Add |
| Date | | | |

PROJECT ENTRY | HOME | REPORTS | LOGOUT

This screen is the point for inputting new projects into the View IT Tool.

Project # | PD345 | Lookup Project # | I have a Non-Portfolio Project | Save |

Project Name   B135NP3E: BLS Merger SA Layer 3-Phase 3     Project Manager - ETE     ETE Carlton Clark
PAT #   26494                                                                          EXPRESS One
PRISM SI #   14637                              Software Development Methodology       HCW
PRISM SI Name   SA/COE - SA/COE                              Project Path
PMT #   307133                                              Current Phase
                                                    Requested Install Date:   10/19/2008

Impacted System(s)*                What are the Benefits associated with this project? *

| DEL | Benefit Metric | Benefit Description | Add |

Available System(s)                Description of Business Problem being solved

AMC-CBTR (9272)
AMC-CCR (7267)
AMC-MLS(7114)
AMC-VIPER (5345)
BO 6.5 (99993)
CEB Reporting (90
CEDB (14935)
DBOR (1255)
GCP (14724)
ISOM (2521)
View IT (99999)

Press and hold Ctrl
Key to select
multiple entries.

FORUM AGENDA CREATION & MEETING MINUTES          HOME  REPORTS  LOGOUT

| Agenda Creation ▽ | Meeting Minutes | Archive |                    | Edit | Save | Generate Agenda |

Sys. ID  GCP (14724) ▽   Meeting Date 04/01/2008 ▽   Search    ◁ Page △ (Page 1 of 1)

Project #          PB002                               GCP Forum Agenda 14724.2008-04-01.01
Project Name       UB Copare Phase 2?GUI Enhancements(PA788)  Project Reviewed at PIF? No
PAT #              16916                               AT&T Business Priority Business
PRISM SI #         14142                               Arch. Solution Doc. required? No
PRISM SI Name      BILLING INVETORY QUALITY            Depend Mgmt. Agreement Required? No
PMT #              290210                              Available Documentation? Other
Project Manager-ETE jk6168                             Baselined with GCP?
Software Dev. Method. One Process                      T&C Level being requested? T&C (0)
Project Path                                           Project Manager-System
Current Phase      Introduction                        Requirements Lead-Primary Franz, Joam Amand
Requested Install Date 03/03/2007                      GCP Forum Template
Solution Architect
Resource Owner-SE Description of Business Problem being solved?
test
What KPIs are associated with this project?
est ○ Allow    E-mail  [          ]  Notify Persenter
○ Disallow Message [        ] ◁▷   and AT&T PM    Move To 04/01/2008 ▽   [Move] [Move All]

| Program Details ▽ | Project Details ▽ | System Details ▽ | | HOME | REPORTS | LOGOUT |

SYSTEM DETAILS

Sys. ID [All Systems ▽]
Resource Owner [▽]
Lead/Primary [▽]
View [All Projects ▽]
Qtr [▽]
Project # [PA591] [Search]

● Overview ○ Deliverable Status

Project #: PA591 (Enterprise Bussiness Reporting)   Project Description and Benefits   [Edit] [Save]

ProjectName Network
PAT # 16870
PRISM SI # 14102
PRISM SI Name
PMT # 290182
Program Manager
Project Manager-ETE Ziemann, Robert
Software Dev. Method. One Process
Project Path
Current Phase Introduction
Requested Install Date 03/03/2007

Internal System Status* [Green ▽]
System Stage* [260 Deployed ▽]
Project Type* [Code & Test ▽]
Project Category* [Network ▽]
Project Manager-System [TBD ▽]
Resource Owner-SE* [Williams, Ken ▽]
Requirements Lead-Primary [Deo, Christopher ▽]
Requirements Lead-Secondary [▽]
Requirements Lead-Other [▽]
Resource Owner-Development* [TBD ▽]
Developer-Secondary [Flemming, Wonhee ▽]
Developer-Other [▽]
Resource Owner-Test* [TBD ▽]
Tester-Primary [TBD ▽]
Tester-Secondary [▽]
Tester-Other [▽]

CAR
IT Client Sponsor Chester, Tina
Requirement Lead
Target Release Date [n/a ▽]
PIF Date 02/16/2007 (mm/dd/yyyy)

| Proj# | Status | Overall | ▽ |
| PRISM* | Int | Project | |
| | Enterprise Bus. Reporting | ▽ | |
| PA591 | n/a | 280 | |
| | DBOR | | |
| PA591 | n/a | 280 | |

PRISM Status [Green ▽]
Due to Enterprise Business Reporting?* [n/a ▽]
Previous Project #s

| Date | Author | Comments | | [Add] |
| 11/09/2007 04:44:13 PM | Ken Williams | EBR was added ti IFP today,cr .6 | | |
| 11/09/2007 03:26:03 PM | Muralidhar Siddabathula | User confirmed that UAT is done Nov 8th 2007 | | |

Move To [04/01/2008 ▽] [Move] [Move All]

* as of Aug-20 @ 08:11AM
* Indicates if status is due to Sys. ID.

☐ Notify Persenter and AT&T PM

○ Allow    E-mail
○ Disallow Message

STAFFING AVAILABILITY

HOME | REPORTS | LOGOUT

Company AT&T  Name Deo, Christopher ▽

Year 2008 ▽  Cost Type Internal Labor (Hrs)  Rate 0

Edit | Save

DAYS – 2008

| | JAN | FEB | MAR | APR | MAY | JUN | JUL | AUG | SEP | OCT | NOV | DEC |
|---|---|---|---|---|---|---|---|---|---|---|---|---|
| Possible* | 22.0 | 21.0 | 21.0 | 22.0 | 21.0 | 21.0 | 22.0 | 21.0 | 21.0 | 23.0 | 18.0 | 22.0 |
| Vacation | 0.0 | 0.0 | 1.0 | 0.0 | 0.0 | 0.0 | 0.0 | 0.0 | 0.0 | 0.0 | 0.0 | 5.0 |
| Other Non-Project Related | 2.0 | 2.0 | 2.0 | 2.0 | 2.0 | 2.0 | 2.0 | 2.0 | 2.0 | 2.0 | 2.0 | 2.0 |
| Available | 20.0 | 19.0 | 18.0 | 20.0 | 19.0 | 18.0 | 20.0 | 19.0 | 19.0 | 21.0 | 16.0 | 15.0 |

*Takes into account company recognized holidays

HOURS – 2008

| Other Non-Project Related Activities | PMT# | JAN | FEB | MAR | APR | MAY | JUN | JUL | AUG | SEP | OCT | NOV | DEC |
|---|---|---|---|---|---|---|---|---|---|---|---|---|---|
| | 301501 | 0 | 0 | 0 | 0 | 0 | 0 | 0 | 0 | 0 | 0 | 0 | 0 |
| Business Operation GM Activities | 283371 | 0 | 0 | 0 | 0 | 0 | 0 | 0 | 0 | 0 | 0 | 0 | 0 |
| Non-Project Administrative Tasks | 283502 | 0 | 0 | 0 | 0 | 0 | 0 | 0 | 0 | 0 | 0 | 0 | 0 |
| Non-Porject Release Activities | 283112 | 0 | 0 | 0 | 0 | 0 | 0 | 0 | 0 | 0 | 0 | 0 | 0 |
| Non-Project Training | 299173 | 0 | 0 | 0 | 0 | 0 | 0 | 0 | 0 | 0 | 0 | 0 | 0 |
| Pre-Sales for External Contractual Aggreements | 283113 | 0 | 0 | 0 | 0 | 0 | 0 | 0 | 0 | 0 | 0 | 0 | 0 |
| Staff Meeting | | 0 | 0 | 0 | 0 | 0 | 0 | 0 | 0 | 0 | 0 | 0 | 0 |
| Total Hours | | | | | | | | | | | | | |
| *Total Equivalent Days | | 0.0 | 0.0 | 0.0 | 0.0 | 0.0 | 0.0 | 0.0 | 0.0 | 0.0 | 0.0 | 0.0 | 0.0 |

*Total Hours/8

FIG. 3G

T&C CREATION/APPROVAL STATUS

HOME | REPORTS | LOGOUT

T&C Creation ▽ | T&C Review | T&C Output | T&C Approval Status | T&C System View | T&C Archive Sys. ID GCP (14724) ▽  Project # PD253 ▽  T&C Type TC (0) ▽  Ver. 1 of 1   Search T&C Creation Date: 03/25/2008  Project Start Date 2008 ▽ Mar ▽  Project End Date 2008 ▽ Apr ▽

Test-only/Test Support-only? ☐  Expense only Project ☐   Project Path HCW ▽   Delete T&C

| DEL | EXPRESS One Sub-Phase | EXPRESS One Activity | Group Mgr. | Functional Area | Work Performed by | 2008-Mar | | | 2008-Ap | |
|---|---|---|---|---|---|---|---|---|---|---|
| | | | | | | Mgmt | Contractor | | Mgmt | C |
| | | | | | | | | | | |
| | | | Total | | | 0 | 0 | 0 | 0 | 0 |

Add New Row | Edit | Save (to finish later) | Submit (for Compliance Review) | Move

FIG. 3H

| T&C Creation ▽ | T&C Review | T&C Output | T&C Approval Status | T&C System View | T&C Archive | HOME | REPORTS | LOGOUT |

T&C CREATION/APPROVAL STATUS

Sys. ID GCP (14724) ▽ Project # PD253 ▽ T&C Type TC (0) ▽ Ver. 1 Dir. All Name ▽ Search T&C Creation Date: 03/25/2008 Project Start Date 2008-Mar Project End Date 2008-Apr ☐ Graphical representation
Test-only/Test Support-only? ☐ Expense only Project? No Project Path HCW ▽ 2008 △ (T&C Adjustment)

| Express One Sub-Phase | JAN | FEB | MAR | APR | MAY | JUN | JUL | AUG | SEP | OCT | NOV | DEC | Total Hours | Total Cost |
|---|---|---|---|---|---|---|---|---|---|---|---|---|---|---|
| 1-Init. Eval | 0 | 0 | 0 | 0 | 0 | 0 | 0 | 0 | 0 | 0 | 0 | 0 | 0 | 0 |
| 2-Reg. & Fund. | 0 | 0 | 0 | 0 | 0 | 0 | 0 | 0 | 0 | 0 | 0 | 0 | 0 | 0 |
| 3a-Design | 0 | 0 | 0 | 0 | 0 | 0 | 0 | 0 | 0 | 0 | 0 | 0 | 0 | 0 |
| 3b-Development | 0 | 0 | 0 | 0 | 0 | 0 | 0 | 0 | 0 | 0 | 0 | 0 | 0 | 0 |
| 3c-Pre-Prod. Test | 0 | 0 | 0 | 0 | 0 | 0 | 0 | 0 | 0 | 0 | 0 | 0 | 0 | 0 |
| 4-Install & PR Test | 0 | 0 | 0 | 0 | 0 | 0 | 0 | 0 | 0 | 0 | 0 | 0 | 0 | 0 |
| 5-Introduction | 0 | 0 | 0 | 0 | 0 | 0 | 0 | 0 | 0 | 0 | 0 | 0 | 0 | 0 |
| Total | 0 | 0 | 0 | 0 | 0 | 0 | 0 | 0 | 0 | 0 | 0 | 0 | 0 | 0 |

| Express One Sub-Phase | Software Capitalization |
|---|---|
| 1-Init. Eval | % |
| 2-Reg. & Fund. | % |
| 3a-Design | % |
| 3b-Development | % |
| 3c-Pre-Prod. Test | % |
| 4-Install & PR Test | % |
| 5-Introduction | % |

T&C CREATION/APPROVAL STATUS

HOME | REPORTS | LOGOUT

| T&C Creation ▽ | T&C Review | T&C Output | T&C Approval Status | T&C System View | T&C Archive |

Sys. ID GCP (14724) ▽  Project # PD253 ▽  T&C Type TC (0) ▽  Ver. 1  [Search]

T&C Creation Date: 03/25/2008  Project Start Date 2008-Mar  Project End Date 2008-Apr ☐ Input tp  [Edit] [Save]
Test-only/Test Support-only? No  Expense only Project? No  Project Path HCW  IFP

Impact Assessment

| Area/Team by EXPRESS One Pase/Deliverable | Estimated Project Activities Hours | Change to Original Estimates | Resource Availability | Change to Original Estimates | Target Release | Historical Projects used for Estimates |
|---|---|---|---|---|---|---|
| 1-Init. Eval | 0 | 0 | | 0 | | |
| 2-Reg. & Fund. | 0 | 0 | | 0 | | |
| 3a-Design | 0 | 0 | | 0 | | |
| 3b-Development | 0 | 0 | | 0 | | |
| 3c-Pre-Prod. Test | 0 | 0 | | 0 | | |
| 4-Install & PR Test | 0 | 0 | | 0 | | |
| 5-Introduction | 0 | 0 | | 0 | | |
| Total Estimated Hours | | | | | | |

| Area/Team | Estimated Non-Labor Cost | Change to Original Estimates | Description | Historical Project used for Costs |
|---|---|---|---|---|
| | 0 | 0 | | |
| | 0 | 0 | | |
| Total Estimated Hours | 0 | 0 | | |

FIG. 3J

T&C CREATION/APPROVAL STATUS

HOME | REPORTS | LOGOUT

T&C Creation ▽ | T&C Review | T&C Output | T&C Approval Status | T&C System View | T&C Archive | Save | Move to Archive Sys. ID [____] ▽  Project # [____] ▽  T&C Type [____] ▽  Ver. [____]  Search

373

| System ID & Name | Date Submitted for Compliance | Project # | T&C Type | Ver | T&C Creation Date | T&C End Date | Total | | Date Compliance Approved | Date Funding Validated | Date Delivered to PM ETE | Date PM ETE Approved | Date T&C Uploaded to PRISM |
|---|---|---|---|---|---|---|---|---|---|---|---|---|---|
| | | | | | | | Hours | Cost | | | | | |
| ○ 1255-DBOR | 03/24/2008 | POA18 | T&C (0) | 1 | 03/24/2008 | 06/2008 | 24 | 1,680 | 03/24/2008 | | | | |
| ○ 14420-OBLICORE | 11/21/2007 | PD758 | T&C (1) | 1 | 11/21/2007 | 12/2007 | 204 | 13,872 | 11/21/2007 | 11/23/2007 | 11/26/2007 | 11/26/2007 | 11/21/2007 |
| ○ 2521-ISOM | 11/15/2007 | PD182 | T&C (1) | 2 | 11/14/2007 | 06/2007 | 646 | 45,220 | 11/16/2007 | 11/16/2007 | 11/16/2007 | 11/16/2007 | 11/16/2007 |
| ○ 2521-ISOM | 11/09/2007 | PD989 | T&C (0) | 1 | 11/06/2007 | 03/2007 | 276 | 19,610 | 11/12/2007 | 11/12/2007 | 11/25/2007 | 11/25/2007 | 11/25/2007 |
| ○ 14420-OBLICORE | 11/07/2007 | PC933, | T&C (1) | 1 | 10/29/2007 | 02/2007 | 10 | 700 | 11/07/2007 | 11/06/2007 | 11/06/2007 | 11/07/2007 | 11/06/2007 |
| ○ 15152-EBR | 11/05/2007 | PC923, | T&C (1) | 1 | 11/01/2007 | 02/2007 | 202 | 13,836 | 11/05/2007 | 11/05/2007 | 11/07/2007 | 11/06/2007 | 11/07/2007 |
| ○ 17428-REME | 11/05/2007 | X0006 | T&C (1) | 1 | 10/30/2007 | 02/2007 | 89 | 6,070 | 11/05/2007 | 11/02/2007 | 11/02/2007 | 11/11/2007 | 11/02/2007 |
| ○ 15152-EBR | 11/02/2007 | PC954. | T&C (1) | 1 | 11/02/2007 | 06/2007 | 547 | 37,840 | 11/02/2007 | 11/31/2007 | 11/31/2007 | 11/02/2007 | 11/02/2007 |
| ○ 15152-EBR | 11/02/2007 | PD628 | T&C (0) | 1 | 10/23/2007 | 08/2007 | 2,756 | 535,342 | 11/02/2007 | 11/02/2007 | 11/02/2007 | 11/02/2007 | 11/01/2007 |

Upload MS-Word Document (Excluding T&C tables)  [Upload] [Download]

Compliance Approver
○ Approve  ○ Disapprove

E-mail Message [____]  [Send E-mail]

Budget Validator
○ Approve  ○ Disapprove

E-mail Message [____]  [Send E-mail]

[ E-mail T&C Package to AT&T PM for Approval ]

EXECUTIVE DASHBOARDS     HOME REPORTS LOGOUT

Red/Yellow Status ▽ In-Progress & Delivery Performance ▽

Exec. Director [Chester, Tina] ▽   Director [Williams, Ken] ▽   PRISM SI# [ ]   Project# [ ]   Year [2008] ▽ Qtr [ ] ▽   Search # of In-Progress & Completed Deliverables YTD

| Milestone-Deliverable | In Progress | # of Deliverables Completed: | | | | |
|---|---|---|---|---|---|---|
| | | Early | On-time | Late | Total | % On-time |
| M3-CR | 0 | 1 | 16 | 8 | 25 | 68% |
| Sub-total | 0 | 1 | 16 | 8 | 25 | 68% |
| M2-T&C (0) | 2 | 5 | 6 | 4 | 15 | 72% |
| M3-Reg. Traceability Matrix | 0 | 1 | 0 | 0 | 1 | 100% |
| M3-Functional-Reqirements | 1 | 0 | 0 | 0 | 0 | 0% |
| M3-Non-Functional-Reqirements | 0 | 0 | 0 | 0 | 0 | 0% |
| M4-T&C(1) | 3 | 18 | 22 | 5 | 45 | 89% |
| M5-High Level Design | 4 | 14 | 23 | 3 | 40 | 93% |
| M6-Application Design | 4 | 1 | 11 | 0 | 12 | 100% |
| M6-Infrastructure-Design | 1 | 2 | 22 | 1 | 25 | 96% |
| M6-Application-Interface-Design | 2 | 1 | 14 | 0 | 15 | 100% |
| M3-Engineering Design Rules Document | 0 | 0 | 0 | 0 | 0 | 0% |
| M6-Installation & Configuration Script | 3 | 10 | 9 | 9 | 28 | 68% |
| M6-Master Test Plan | 0 | 1 | 0 | 0 | 1 | 100% |
| M6-Approved Unit Test Paln | 2 | 0 | 0 | 0 | 0 | 0% |
| M6-Integration Test Plan | 0 | 0 | 1 | 0 | 1 | 100% |

METHOD AND SYSTEM FOR DYNAMIC PROJECT MANAGEMENT AND CAPACITY MANAGEMENT

BACKGROUND

Project management is the discipline of planning, organizing, and managing resources in order to achieve a successful completion of specific project goals and objectives. A project may be described as a finite endeavor, having specific start and completion dates undertaken, to create a unique product or service that brings about beneficial change or added value. This finite characteristic of projects sets projects apart from business operations, which may be described as permanent or semi-permanent functional work to continuously produce the same product or service. In practice, the management of both projects and business operations systems is often found to be quite different, and as such requires the development of distinct technical skills and the adoption of separate management philosophies.

The primary focus of any project management system is to achieve each of the project goals and objectives while adhering to typical project constraints, such as scope, quality, capacity, time and budget. A secondary focus would be to optimize the allocation and integration of inputs necessary to meet pre-defined objectives. A project may include a carefully defined set of activities that use resources (e.g., money, people, materials, energy, space, provisions, communication, motivation, etc.) required to achieve the project goals and objectives.

Project management is typically the function and responsibility of an individual project manager. While the project manager seldom participates directly in the activities that produce the end result, he or she strives to maintain the progress and productive interaction of various parties in such a way to reduce the overall risk of failure. A competent project manager must be able to envision the entire project from start to finish and to have the ability to ensure that the project is realized. Regardless of the type of product or service, whether it is telecommunications, pharmaceuticals, manufacturing construction, computer software, financial services, the project manager may oversee the implementation of the project, as well as the operations of the project.

With large volumes of work and projects, organizations quickly become disorganized. The currently available corporate tools cannot support the level of granularity needed to effectively manage this work. There are inconsistencies in the process individuals use to create time and cost estimates, which results in estimates being so uniquely tailored that there is no rollup of data that can provide a project manager with meaningful information. The inability to accurately track critical project data creates a myriad of data integrity issues, insert/deletion anomalies, multi-user issues, data corruption, and individual field deadlocks. The end result of the inefficient tracking is inconsistent data and poor decision making abilities, which, in many cases, will lead to project mismanagement.

SUMMARY OF THE INVENTION

The present invention generally related to systems and methods for dynamic project management and capacity management. Specifically, the exemplary embodiments are related to a management tool for performing project management, capacity management, and time and cost creation across systems and departments for the lowest levels of data. The management tool include a computer readable storage medium including a set of instructions that are executable by a processor, the set of instructions being operable to store projected time information and projected cost information for a project, store actual time information and actual cost information for the project, and display a correlation between i) the projected time information and actual time information, and ii) the projected cost information and the actual cost information.

BRIEF DESCRIPTION OF THE DRAWINGS

FIG. 2 shows an exemplary method for inputting, tracking, and summarizing project management data according to an exemplary embodiment of the present invention.

FIG. 3A shows an exemplary screen view for entering pre-sales entry information via the management tool according to an exemplary embodiment of the present invention.

FIG. 3B shows an exemplary screen view for entering project entry information via the management tool according to an exemplary embodiment of the present invention.

FIG. 3C shows an exemplary screen view for entering forum registration data via the management tool according to an exemplary embodiment of the present invention.

FIG. 3D shows an exemplary screen view for creating a forum agenda and entering forum meeting minutes via the management tool according to an exemplary embodiment of the present invention.

FIG. 3E shows an exemplary screen view for displaying a view of project details via the management tool according to an exemplary embodiment of the present invention.

FIG. 3F shows an exemplary screen view for displaying a view of staffing availability via the management tool according to an exemplary embodiment of the present invention.

FIGS. 3G-3J show exemplary screen views for displaying various screens for T&C reporting via the management tool according to an exemplary embodiment of the present invention.

FIGS. 3L-3M show exemplary screens view for displaying views of project status, project progress, and delivery performance via the management tool according to an exemplary embodiment of the present invention.

DETAILED DESCRIPTION

Figure 1:
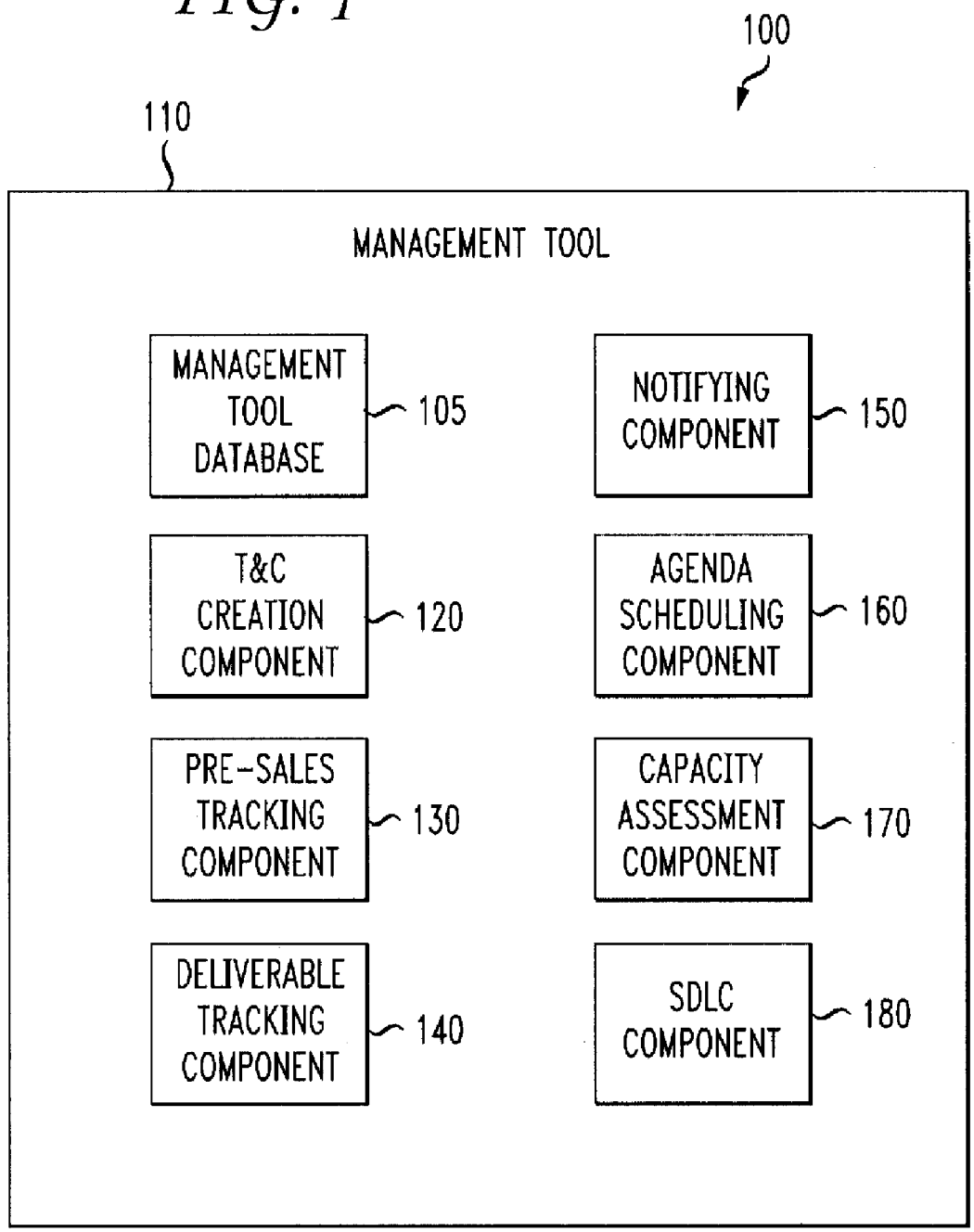
FIG. 1 shows an exemplary system for performing project management, capacity management, and time and cost creation across systems and departments for the lowest levels of data according to an exemplary embodiment of the present invention.

The exemplary embodiments of the present invention may be further understood with reference to the following description and the related appended drawings, wherein like elements are provided with the same reference numerals. The exemplary embodiments of the present invention are related to systems and methods for dynamic project management and capacity management. Specifically, the exemplary embodiments are related to systems and methods for performing project management, capacity management, and time and cost creation across systems and departments for the lowest levels of data. Furthermore, the exemplary embodiments may utilize a web-based information technology ("IT") management tool, for facilitating the inputting, tracking, decision-making, and reporting of project deliverables and artifacts. It should be noted that the exemplary IT management tool, or simply tool, may be achieved through the reuse of readily available data augmented by user input.

That is, as will be described in examples below, data may be input into the management tool by a user via a user interface. In addition or alternatively, data may be received and imported into the management tool from other systems (e.g., time keeper systems, etc.) or may be calculated by the management tool based on data previously entered into the management tool. Once this data is retained by the management tool, the data may be reused across multiple views or processes carried out by the management tool. This reuse of data ensures consistency of data between systems and organizations.

According to the exemplary embodiments of the present invention, the exemplary tool may provide IT managers with the ability to manage and monitor their projects at a more meaningful and useful level of detail, while also helping to facilitate some labor-intensive activities. In addition, project managers may benefit as well by having better insight into a project's progress and the underlying deliverables that may be falling behind schedule. Thus, the exemplary tool may allow the project managers to more effectively mitigate risk.

In addition, the exemplary management tool may allow user such as project managers to efficiently and effectively track critical project data at the lowest levels of data. The exemplary management tool provides for both automation and consistency in creating time and cost reports. As will be described in greater detail below, the exemplary management tool allows for tracking the details of a deliverable at an application level. In addition, the exemplary management tool provides a central repository for tracking detailed system deliverables and storing time and cost estimates. Furthermore, the exemplary management tool offers workflow capabilities and tracks data at a detail sufficient enough to create a model for displaying data by resource and/or by job function. Thus, the exemplary management tool is capable of incorporating capacity planning at a very granular level (e.g., at the system level).

It should be noted that the exemplary management tool may also provide combined horizontal and vertical detailed views. When a project is tracked and viewable horizontally, a user (e.g., a project manager) may see all of the data across systems, resources, and managers. When a project is tracked and viewable vertically, the user may see all of the data from a system-specific view that shows the status of only that particular system. Accordingly, the exemplary embodiments of the present invention described herein may provide such horizontal and vertical view at a very detailed and granular level (e.g., at the system level).

The exemplary management tool according to the exemplary embodiments of the present invention solves any conventional problems and shortcomings in project management and capacity management. For instance, the exemplary management tool may assist resources that charge their time by showing the user exactly how much they should charge. Furthermore, the exemplary embodiment of the management tool may solve these problems by using a highly efficient process that drives consistency while urging users to follow standard processes.

As discussed above, the exemplary embodiments of the present invention will be described with reference to a web-based IT management tool. However, those skilled in the art will understand that the present invention may be implemented in any type of business operation, whether it is in the field of IT or outside of IT. As will be described in greater detail below, regardless of the systems used, and regardless of which process a business uses, the portability and flexibility of the exemplary management tool may allow a project manager to track projects, model capacity and create management dashboards (e.g., executive dashboards) without any need to purchase large enterprise packages.

FIG. 1 shows an exemplary system 100 for performing project management, capacity management, and time and cost creation across systems and departments for the lowest levels of data according to an exemplary embodiment of the present invention. The system may include a management tool 110 for consolidating any data tracked by separate parties in order to provide a user with a single overall view of this data. According to the exemplary embodiments of the system 100, the tool 110 may be a web-based piece of software (e.g., such as one having an Oracle RDBMS back end). This web-based software may reuse existing data to ensure consistency of data between multiple systems and organizations, and may allow users to create reports that are meaningful to all different levels of management.

The exemplary system 100 may include a management tool database 105, wherein any actions taken by a user on any screen within the management tool 110 may be saved in the management tool database 105. Specifically, the data stored in the management tool database 105 may include employee information (e.g., a name and identification number of an employee, available time, current projects, etc.), as well as project and opportunity information (e.g., project/opportunity names and identification numbers, time and cost data, historical project data, etc.) Furthermore, the management tool database 105 may include a log file to track any changes made to the data (e.g., a screen number and field name/number that was modified, a field's before and after value, and the date & time when the modification was made). Accordingly, the log file may track information for auditing and compliance purposes (e.g., Sarbanes Oxley compliance). Thus, the user input may be automatically saved at the field-level in order to minimize any data loss and to provide other users with instant (e.g., "real-time") updates.

The tool 110 may further include a time and cost ("T&C") creation component 120. The T&C creation component 120 may create T&C reports at each of the phase level, the activity level, and the resource level. In addition, the T&C creation component may then consolidate multiple T&C reports without having to use a separate tool outside of the management tool 110. It should be noted that the T&C creation component 120 may build T&C reports in a compliant and consistent manner. An exemplary T&C report may include information pertaining to any particular project, such as, but not limited to, a project identifier (e.g., name, case number, etc.), project description, project type, project activity, project approval status, creation date, start date, employee identifier(s), job code/function, management hours, contractor hours, estimated costs, estimated hours, historical project estimates, changes to original estimates, etc.

The workflow for creating T&C reports may be an automated process built into the T&C creation component 120 that saves the time of manual notifications while providing a streamlined and expedited production. Furthermore, the data utilized by the T&C creation component 120 may be more detailed and granular than any conventional management system. Accordingly, the T&C creation component 120 may allow users, such as executives, to observe their respective workloads in a horizontal and vertical manner, providing a complete picture of the current status of business operations.

According to the exemplary embodiments of the present invention, the T&C creation component 120 may create T&C reports at the phase and activity level, as well as down to the individual resource. Therefore, the T&C may report time and cost capability with great detail, capitalization calculations, expense calculations, and the ability to add automatic overhead. Thus, the data encapsulated by the T&C creation component 120 of the tool 110 may afford users with access to data in which they are truly authorized to view. Furthermore, the tool 110 may save managers great deal of time and resources by reducing the amount of meetings and conferences that would otherwise be called to review the status of a project.

The tool 110 may include a pre-sale tracking component 130. It should be noted that the pre-sales process may include opportunities and requests for proposals ("RFPs"). An opportunity may be defined as a chance for a business (e.g., a user of the tool 110) to satisfy a customer's product or service requirement. Accordingly, opportunities may be typically identified by a sales team based on knowledge of an existing and/or potential need of a customer. An RFP may be a request from a potential or existing client for a price quote, wherein the RFP may include a client's product/service requirements as well as a description of the required format, timing, and content of the price quotes to be submitted. Pre-sales process may further include IT work requests ("IWRs"). An IWR may assist a client in articulating the business need and/or problem, and may provide system solutions for this need or problem. An IWR may also include a scope statement and details to support an initial impact assessment.

According to the exemplary embodiments of the present invention, the pre-sales tracking component 130 may provide a framework for documenting and tracking requests for proposals consistently. Thus, the pre-sales tracking component 130 may allow for the management tool 110 to achieve maximum overall efficiency, as well as quicker response time for the requested service.

Through the use of the pre-sales tracking component 130, a pre-sales business manager has the ability to determine and define a opportunity's overall schedule, and then view the overall status of the opportunity in comparison to the defined schedule. Furthermore, the management tool 110 may archive data (e.g., such as the T&C estimates) for quick and efficient viewing at a later date.

The tool 110 may further include a deliverable tracking component 140. Specifically, the deliverable tracking component 140 may be in the form of one or more executive dashboards reporting project deliverables, such as, for example, software development life cycle deliverables. A deliverable may be defined as a product or service produced as a result of project execution, typically as part of an obligation to a client. Similar to the pre-sales process described above, the deliverable tracking component 140 allows for tracking and documenting the details of a deliverable at an application level. It should be noted that these tracked deliverables may be viewable to a user (e.g., an executive) via dashboards. Specifically, the executive dashboards may provide information such as a description of each deliverable, a quantity of "in progress" deliverables, a quantity of completed projects, an assessment of the completed projects (e.g., early, on time, late, percentage on time), etc. In addition, the dashboards may be streamlined to provide one view for many deliverables, as well as performance metrics for each deliverable.

The tool 110 may further include a notifying component 150. The notifying component 150 may send a notification (e.g., an e-mail alert) and post a comment whenever any pre-identified triggers have been activated by a user. These triggers may include user-directed functions, such as, for example, pressing a button, entering a value of a field, entering system date, etc. Each of these triggers may activate an automated response (e.g., an associated action), such as, for example, automatically sending an e-mail message, automatically updating a field, performing a calculation, etc. For example, a "submit" button from within a "New Users Click Here" pop-up input box may be clicked by a user. Accordingly, an e-mail message may be automatically be generated and sent to managers who have been designated as having a role of "system administrator." The email message may also contain a hyperlink to a screen where the administrator can input the new user data.

The tool 110 may further include an agenda scheduling component 160. The agenda scheduling component 160 may automatically create, organize, and e-mail an agenda and subsequent meeting minutes for any systems and/or applications that have a requisite forum meeting prior to starting any project work. It should be noted that each of the projects may be registered with a specific client or organization's forum. Therefore, the agenda scheduling component 160 may track the project identifiers (e.g., project name, project number, etc.), as well as the project manager, the planned install date, etc. Accordingly, the forum agenda and issues relating to the forum may be provided to a forum coordinator, wherein the forum coordinator may act as a point of contact to the client.

The tool 110 may further include a capacity assessment component 170. It should be noted that the capacity assessment component 170 may provide standardization to capacity reporting. Specifically, the capacity assessment component 170 may examine staffing availability and track all work against availability for an individual resource (e.g., by job function, by time period, etc.). The capacity assessment component 170 may then determine the capacity of the business or organization by comparing T&C estimates to the available resources. Therefore, capacity management may provide capacity models at both an employee level and a resource level in order to determine how resources are being used and which employees are free for additional work or are overworked. Upon examining these models, a user (e.g., an executive, a project manager) may quickly and efficiently determine whether a given project is over-staffed or understaffed.

Staffing availability may be tracked on a per employee basis. Specifically, each employee may be associated with a list of one or more available job functions, wherein each job function may perform a variety of tasks and/or activities for a given project. Accordingly, each job function may be assigned a percentage value of time spent performing all associated job functions. For example, a first job function maybe assigned 50% of the employee's time, while two other job functions may each be assigned 25% of the employee's remaining time. The staffing availability may also take track the possible workdays available to each employee for each month in a given year. Each employee's report may take into account any vacation or non-project related days for that employee. Thus, the capacity assessment component 170 may accurately calculate the number of available days per month for each employee. It should be noted that the capacity assessment component 170 may use historical data from prior months in combination with projected data from T&C estimates to determine each employee's overall effort on a given project, as well as the employee's availability for further work on that project.

The capacity assessment component 170 may create models for capacity (e.g., "factory capacity"). Specifically, the capacity assessment component 170 may examine T&C reports for both committed projects and uncommitted projects in order to determine if capacity is available for a project. It should be noted that all projects may be assessed through estimates, wherein these estimates are provided back to business partners. The estimates may include information such as the number of hours of efforts for a given project across software development life cycle ("SDLC") phases. Accordingly, each of these estimates may be considered "uncommitted" until the business formally funds the project, upon which the estimate may become "committed". In other words, committed hours may be time (e.g., hours) devoted to an approved project at hand, while uncommitted hours may be time (e.g., hours) devoted to unapproved projects, etc. Available time may be estimated from a sum of workdays for a given month. For example, available time may be 152 hours per month per employee. This number of workdays may exclude any vacation time and holidays. From this available time, both committed hours and uncommitted hours for each employee may be deducted to determine whether an employee is over or under the number of hours available to that employee for particular month. Thus, a user may easily identify any employee that may be under-worked and assign that employee to a new project, task, activity, etc.

According to the exemplary embodiments of the present invention, the data from the capacity assessment component 170 (e.g., capacity reports, capacity models, etc.) may be rolled up to any level of management via the management tool 110, thereby providing realistic insight into the business. For example, a user may be able to examine which employees are currently working on a given project, examine how much time is available from the current employees, and determine whether more or less resources (e.g., additional employees) are required to complete the project within an estimated deliverable time frame. Therefore, the capacity assessment component 170 may provide users, such as executives, with the ability to model, by employee and functional area on a capacity modeling screen of the management tool 110. Thus, the management tool 110 is able to provide an end-to-end holistic view of the work environment (e.g., a factory) that allows for full visibility into the organization and improved capability.

Furthermore, the tool 110 may also include a process unification component, such as a software development life cycle "SDLC") component 180. The SDLC component 180 may be fully compliant with the tool 110, wherein the SDLC component 180 may define different life cycles to any variety of software applications. Accordingly, the SDLC component 180 may include initiation processes, SDLC processes, and production operations processes. Furthermore, the SDLC component 180 may provide a framework for unifying and continuously improving IT processes. Specifically the SDLC component 180 may create a foundation and common language for defining IT processes for the entire plan-build-run cycle. The SDLC component 180 may integrate multiple legacy processes, thereby enabling team members from various organizations to work together immediately regardless of their legacy organization. The framework for the SDLC component 180 may allow for handoffs between each of the processes, may define roles and responsibilities, activities, artifacts and methods throughout the various phases of initiative, project, and sustainment efforts.

FIG. 2 shows an exemplary method 200 for inputting, tracking, and summarizing project management data according to an exemplary embodiment of the present invention. It should be noted that method 200 will be discussed with reference to tool 110 and components of the system 100 of FIG. 1.

Beginning with step 210, may receive pre-sales entry information from a user. FIG. 3A shows an exemplary screen view 310 for entering pre-sales entry information via the management tool 110. The pre-sales entry information may include employee identifiers (e.g., name and number), a client name, a custom solution name, opportunity number, status, correspondence dates, client contact information, opportunity comments, etc. Accordingly, a user may click an "Add New RFP/Opportunity" button on the pre-sales entry and the management tool 110 may automatically generate, assign, and display a sequential opportunity number. This opportunity number may allow the user to track and search the newly created opportunity.

In addition, the pre-sales entry information may allow a user to enter high order of magnitude ("HOM") estimates. An HOM may be defined as an initial high-level estimate of the labor and non-labor costs associated with a particular solution (e.g., system, application, tool, etc.) in response to a client's opportunity and/or needs.

Furthermore, the pre-sales entry information may allow a user to enter IWR. As described above, IWR may assist a client in articulating their business needs or problems and for providing system solutions. For a given opportunity or RFP, there may be one or more IWRs, and for each IWR there may be one or more projects. It should be noted that all pre-sales entry information, such as opportunity data, HOM data, IWR data, etc., may be archived in a searchable database (e.g., the management tool database 105). Accordingly pre-sales entry information may be searched for and retrieved for a user by entering any of the associated information (e.g., client name, opportunity number, etc.).

In step 220, the management tool 110 may receive project entry information from a user. FIG. 3B shows an exemplary screen view 320 for entering project entry information via the management tool 110. The project entry information may include the project identifiers, the project manager, the available systems for the project (based on systems assigned to a role of the user), the systems impacted by the project, the benefits of the project, a business solution provided by the project, etc. A given benefit may be associated with the project that was either inputted by the user or automatically generated by the management tool 110.

Figure 3C:
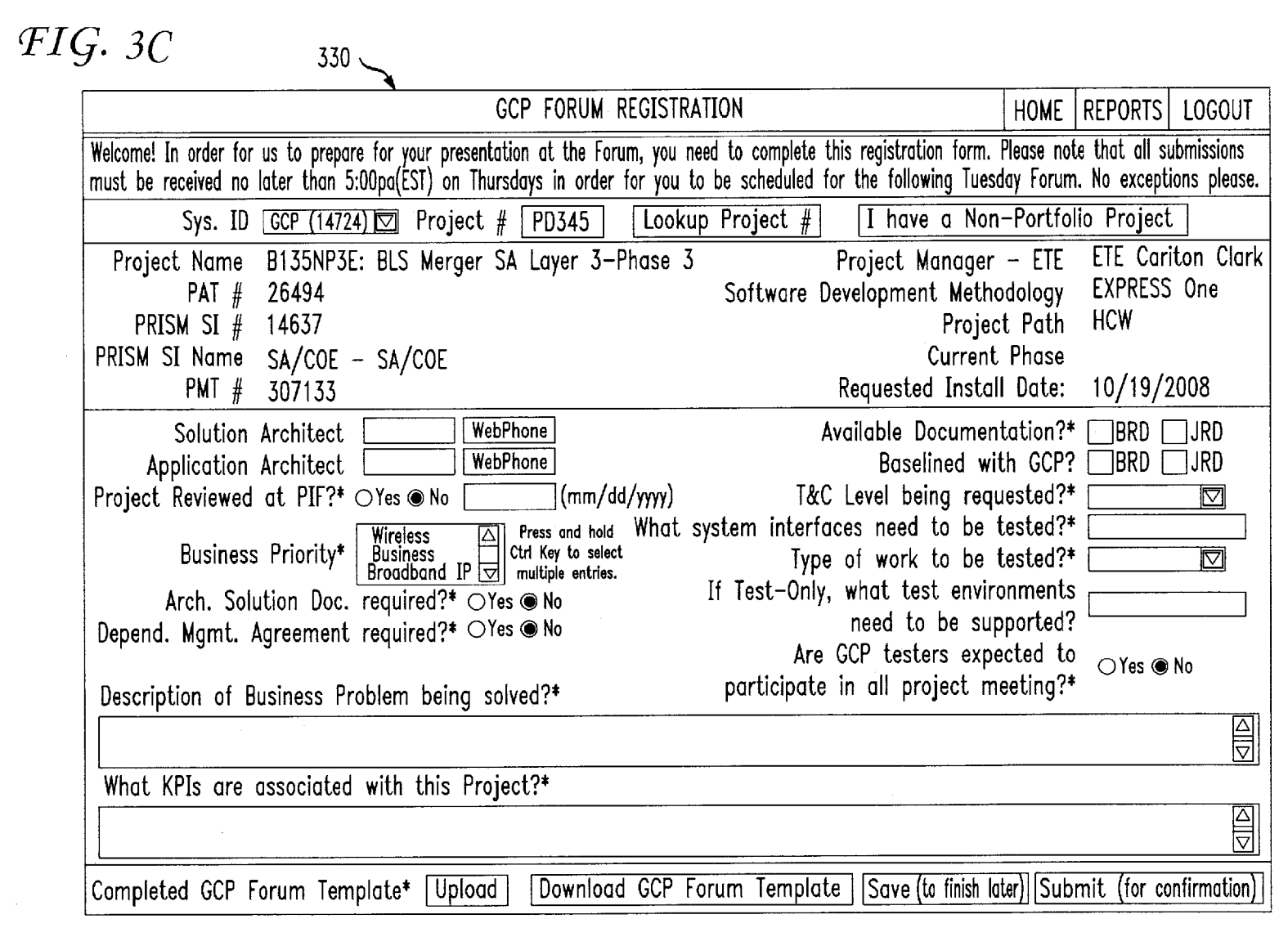

In step 230, the management tool 110 the management tool 110 may receive forum registration data from a user. FIG. 3C shows an exemplary screen view 330 for entering forum registration data via the management tool 110. As described above, the forum registration may include a project identifier (e.g., name and number), project manager, project type, business type, project description, requested install date, as well as additional administrative data. In order to keep any projects that are associated with one organization's forum separate from the projects that are associated with another organization's forum, each of the projects may be assigned a forum number.

In step 240, the management tool 110 may receive forum agenda creation information and forum meeting minutes. FIG. 3D shows an exemplary screen view 340 for creating a forum agenda and entering forum meeting minutes via the management tool 110. The forum agenda may include project name and number, project manager, forum agenda number, meeting date, current project phase, as well as a description of the problem to be solved. Once the forum agenda is created, a user may provide forum meeting notes that detail the events of the meeting. Similar to the pre-sales entry information, all of the forum agenda information may be archived in a searchable database (e.g., the management tool database 105).

In step 250, the management tool 110 may manage and track a project's deliverables and artifacts at the system/application level. Accordingly, the management tool 110 may display an overview of a project and track status of project's deliverables. FIG. 3E shows an exemplary screen view 350 for displaying project details via the management tool 110.

The project details may include a project number, a project manager, project status, requirements, target release date, as well as user comments. The overview may further include deliverable status information, which may be tracked by the management tool 110. The deliverable status information may identify the deliverable (or artifact), as well as a target start and end dates and completion progress (e.g., % complete).

In addition, the overview of the project may include overall schedule information. The project's overall schedule information may provide users with a plurality of deliverables/ milestones, planned start and end dates, a target end date, percentage complete status, comments, etc. It should be noted that the user may input the planned start date and the planned end date. As portions of the project are completed, the management tool 110 may track these changes and the percentage complete status may be adjusted. Furthermore, automated e-mail messages may be provided to the project manager(s) at selected intervals (e.g., as the target data approaches, at the target date, after the target date, etc.).

In step 260, the management tool 110 may determine staffing availability. FIG. 3F shows an exemplary screen view 360 for displaying a view of staffing availability via the management tool 110. As described above, staffing availability may be tracked on a per employee basis. Each employee may be associated with staffing source and a list of available job functions, wherein each job function may be assigned a percentage value of time spent performing each job function. The staffing availability may also take monthly workdays and employee vacation into account when assessing each employee's availability. Accordingly, the management tool 110 may calculate and save the respective availability details for each employee.

In step 270, the management tool 110 may generate and review T&C reports. FIGS. 3G-3J show exemplary screen views 370-373 for displaying various screens for T&C reporting via the management tool 110. Initially, it should be noted that a user may submit a new T&C report for a specific project by inputting the associated project number into a T&C creation screen 370. Accordingly, the T&C creation screen 370 may request data at a very granular level of the project. As depicted in FIGS. 3G-3J, examples of granular data may include information such as, for example activity levels, milestone levels, individual resources, etc. For instance, granular data may indicate which activities are expensed and which activities are capitalized.

Upon creating the T&C report, the management tool 110 may provide the user with an overall T&C review of the hours and costs associated with each phase of the project. Thus, the T&C review screen 371 may provide a detailed summary the time and cost associated with each phase of the project. As illustrated in FIG. 3H, the T&C review screen 371 may be broken down in a monthly basis to provide the user with visual feedback as to exactly when each phase is to be completed. As illustrated in FIG. 3I, the T&C output screen 372 may display time and cost estimates as well as resource availability. In addition, T&C output screen 372 may summarize estimated project activity hours, any changes in the original estimates, resources that are available, historical projects used for estimates, target release dates, etc. As illustrated in FIG. 3J, the T&C approval screen 373 may track and display the approval status for each T&C report. The T&C approval screen 373 may provide a detailed summary of relevant dates, such as dates of creation, end dates, compliance submission, compliance approval, the date funding was validated, date delivered to project manager, the date uploaded to the management tool 110, etc. It should be noted that all T&C reporting information, such as the creation, the review, the approval, etc., may be archived in a searchable database (e.g., the management tool database 105).

Figure 3K:
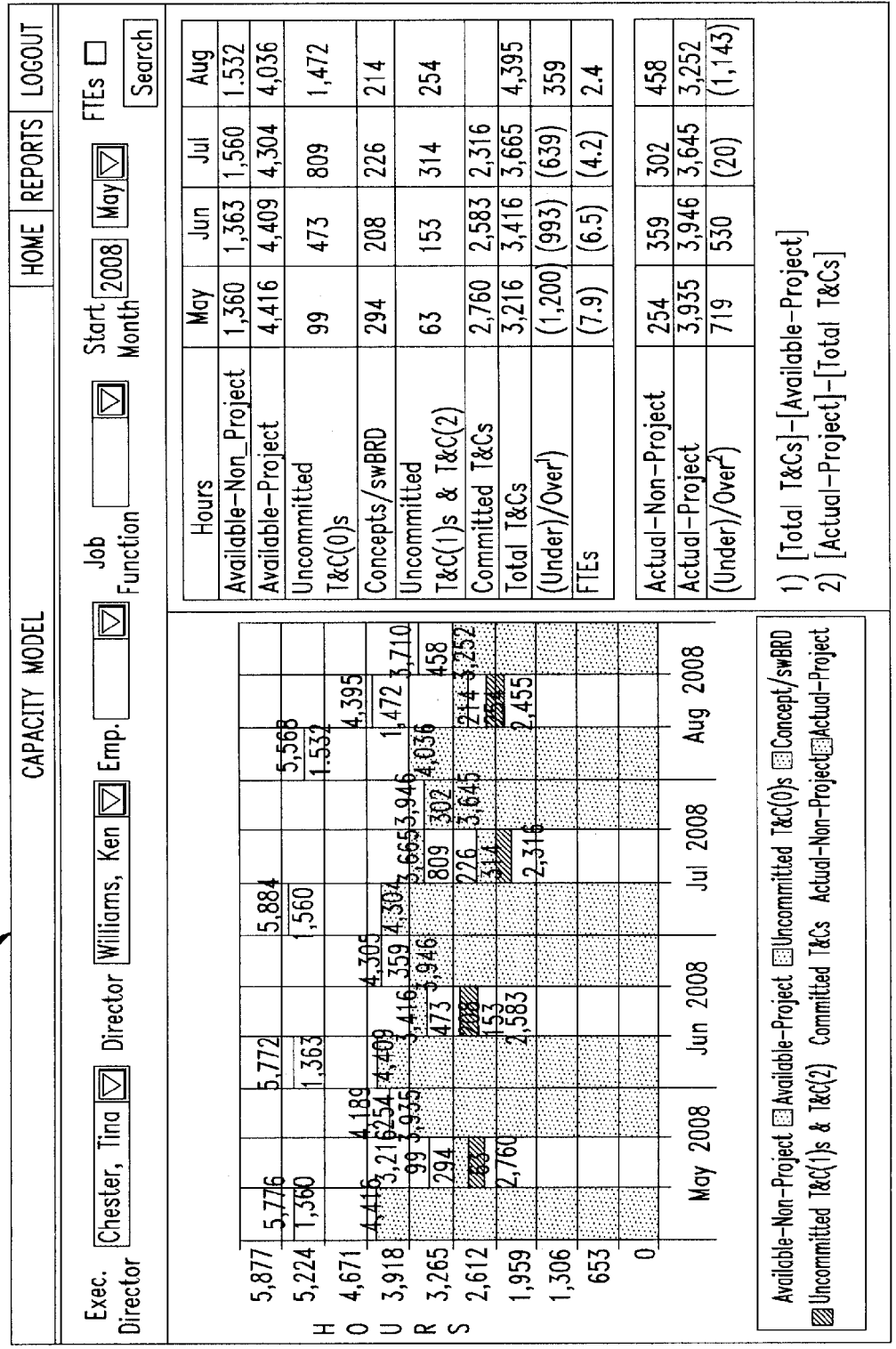
FIG. 3K shows an exemplary screen view for displaying a view of capacity modeling via the management tool according to an exemplary embodiment of the present invention.

In step 280, the management tool 110 may create capacity modeling. FIG. 3K shows an exemplary screen view 380 for displaying capacity modeling via the management tool 110. The capacity modeling view may display the monthly hours available to specific project manager, as well as number of hours that either committed or uncommitted to projects. As described above, the capacity models allow the management tool 110 to track all the estimated work required for a project against the availability for an individual resource, as in the staffing availability determined in step 260. It should be noted that capacity models may be created to display data either by individual resource or by job function.

Figure 3L:
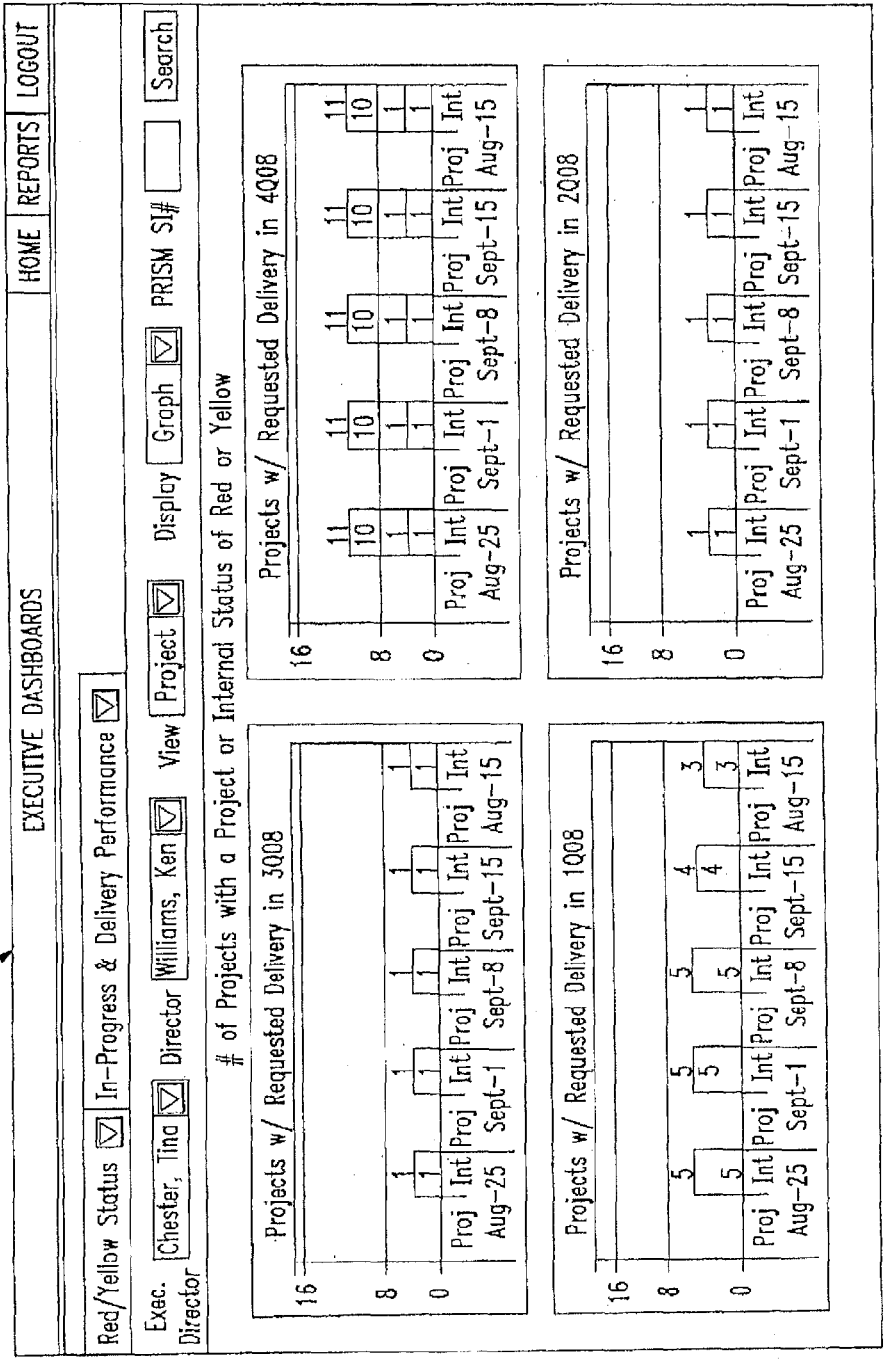

In step 290, a project dashboard (e.g., executive dashboard) is created to allow users to monitor the overall progress and delivery performance of the project. FIG. 3L shows an exemplary screen view 390 for displaying a quarterly view of project status in a graph display, while FIG. 3M shows an exemplary screen view 391 for displaying project progress and delivery performance in a table display via the management tool 110. The executive dashboard may provide a user with a summary of RFPs and/or opportunities. This summary may be viewable for a selected employee in order to provide a high level of visibility into the organization. The dashboard may streamline the information collected by the management tool 110 and provide a single view for many deliverables, as well as a view of performance metrics for each of these deliverables. Specifically, as depicted in screen view 390, the dashboard may display a list of deliverables, and for each deliverable there may be status information such as the number of "in progress" deliverables, the number of completed deliverables, the percentage of deliverables completed on-time, etc.

According to the exemplary embodiments, management tool 110 and the method 200 may allow for capacity modeling at various levels, while providing the time and cost capability reports. As described above the T&C reports may be created at any one of the phase level, the activity level, and even down to the individual resource level. It is important to note that no other conventional estimation creation tool is as sophisticated as the exemplary management tool 110 in terms of the level of detail, capitalization calculations, expense calculations, and the ability to add automatic overhead. Accordingly, the management tool 110 provides users with an unprecedented level of visibility into the day-to-day operations of the organization, the project managers and each individual employee. Furthermore, the management tool 110 provides this capability without the high cost of large enterprise applications having limited capabilities.

From a broader perspective, the management tool 110 allows for increased productivity by reducing individual manual tracking efforts while ensuring consistency and reliability in the execution and reporting of project status. Furthermore, the management tool 110 may provide useful and insightful system/program/project-level metrics and charts/graphs that result in improved decision making. The data is tracked from their inception (e.g., the pre-sales stages) all the way to the deployment at the lowest level possible. Thus, the management tool 110 may effectively contribute to the achievement of an organization's goal of 100% on-time delivery performance and overall improvement of operational efficiency, thereby resulting in increased customer satisfaction.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A computer readable storage medium including a set of instructions that are executable by a processor, the set of instructions being operable to:
   store projected time information and projected cost information for a project;
   store actual time information and actual cost information for the project;
   display a correlation between i) the projected time information and actual time information, and ii) the projected cost information and the actual cost information;
   store available time for a plurality of employees assigned to the project, the available time being stored based on a predetermined time interval;
   store job functions for the plurality of employees;
   display a total available time for each of the job functions; and
   display a total available time for all the employees in the predetermined time interval wherein the available time for each employee is one of committed time to a task of the project and uncommitted time, the displaying of the total available time including a display of the committed time and the uncommitted time.

2. The set of instructions of claim 1, wherein the predetermined time interval is one of weekly, monthly, quarterly and yearly.

3. The set of instructions of claim 1, further operable to: assign one of the employees to a task/activity of the project based on the stored available time and at least one of the job functions.

4. The set of instructions of claim 1, further operable to: determine a capacity for staffing the project based on one of the stored available time and at least of the job functions.

5. The set of instructions of claim 1, further operable to:
   store a plurality of tasks/activities for the project, wherein the displaying is based on the projected time information, the projected cost information, the actual time information and the actual cost information for each task/activity.

6. The set of instructions of claim 5, wherein the displaying is one of limited to one of the tasks/activities, limited to a subset of the tasks/activities and for all of the tasks/activities.

7. The set of instructions of claim 5, further operable to:
   calculate a completion percentage of each task/activity based on the projected time information and the actual time information; and
   display the completion percentage for each task/activity.

8. The set of instructions of claim 7, wherein the calculating is further based on the projected cost information and the actual cost information.

9. The set of instructions of claim 1, further operable to:
   store a plurality of tasks for the project, each task including a projected completion date;
   store an actual completion date for at least some of the tasks;
   determine, for each task that includes an actual completion date, whether the task was completed one of early, on-time and late based on a comparison between the projected completion date of the task and the actual completion date;
   display the determined one of early, on-time and late for each task.

10. The set of instructions of claim 9, further operable to: display that each of the tasks that does not include an actual completion date is in progress.

11. The set of instructions of claim 1, further operable to:
    receive one of the projected time information, the projected cost information, the actual time information and the actual cost information from a user via a user input display.

12. The set of instructions of claim 11, further operable to:
    store a plurality of authorized users, each user including one or more defined roles for the project; and
    limit input access to the user input display based on the one or more defined role of the user.

13. The set of instructions of claim 1, wherein a user selects a type of the correlation to be displayed.

14. The set of instructions of claim 1, further operable to:
    store additional information for the project; and
    display the additional information.

15. The set of instructions of claim 14, wherein the additional information includes one of a project number, project personnel, a project benefit metric, a project benefit description, a project name, a project meeting schedule, a project meeting agenda, and project meeting notes.

16. The set of instructions of claim 1, further operable to:
    generate alerts based on the correlation; and
    send the alerts to authorized users.

17. The set of instructions of claim 1, further operable to:
    store pre-sales information for the project, the pre-sales information including an identification of one of a request for proposal and at least one opportunity; and
    display the pre-sales information.

18. A management system, comprising:
    a memory storing a management tool, the management tool comprising:
       a time/cost reporting component storing projected time information and projected cost information for a project, storing actual time information and actual cost information for the project, and reporting a correlation between i) the projected time information and actual time information, and ii) the projected cost information and the actual cost information;
       a capacity assessment component storing available time for a plurality of employees assigned to the project, storing job functions for the plurality of employees, and determining a capacity for staffing the project based on one of the stored available time and at least of the job functions;
       a pre-sales tracking component storing pre-sales information for the project, the pre-sales information including an identification of one of a request for proposal and at least one opportunity and tracking the pre-sales information; and
       a dashboard component storing a plurality of tasks for the project, wherein the reporting is based on the projected time information, the projected cost information, the actual time information and the actual cost information for each task, calculating a completion percentage of each task based on the projected time information and the actual time information, and displaying the completion percentage for each task; and
    a processor executing the management tool.

* * * * *